(12) United States Patent
Lee et al.

(10) Patent No.: US 12,519,135 B2
(45) Date of Patent: Jan. 6, 2026

(54) ELECTROLYTE SOLUTION FOR LITHIUM SECONDARY BATTERY AND LITHIUM SECONDARY BATTERY INCLUDING SAME

(71) Applicants: Hyundai Motor Company, Seoul (KR); Kia Corporation, Seoul (KR); UNIST (Ulsan National Insitute of Science and Technology), Ulsan (KR)

(72) Inventors: Yoon Sung Lee, Gyeonggi-do (KR); Jun Ki Rhee, Gyeonggi-do (KR); Ko Eun Kim, Chungcheongbuk-do (KR); Sung Ho Ban, Gyeonggi-do (KR); Seung Min Oh, Incheon (KR); Sang Kyu Kwak, Ulsan (KR); Sung You Hong, Ulsan (KR); Nam Soon Choi, Ulsan (KR); Min Ho Jeon, Ulsan (KR); Hyeong Jun Kim, Ulsan (KR); Hui Beom Nam, Ulsan (KR)

(73) Assignees: Hyundai Motor Company, Seoul (KR); Kia Corporation, Seoul (KR); UNIST (Ulsan National Institute of Science and Technology), Ulsan (KR)

( * ) Notice: Subject to any disclaimer, the term of this patent is extended or adjusted under 35 U.S.C. 154(b) by 671 days.

(21) Appl. No.: 17/893,856

(22) Filed: Aug. 23, 2022

(65) Prior Publication Data

US 2023/0207876 A1    Jun. 29, 2023

(30) Foreign Application Priority Data

Dec. 29, 2021    (KR) .................. 10-2021-0191207

(51) Int. Cl.
*H01M 10/0567*    (2010.01)
*H01M 4/02*    (2006.01)
(Continued)

(52) U.S. Cl.
CPC ....... *H01M 10/0567* (2013.01); *H01M 4/505* (2013.01); *H01M 4/525* (2013.01);
(Continued)

(58) Field of Classification Search
CPC ......... H01M 10/0567; H01M 10/0569; H01M 2300/0025
See application file for complete search history.

(56) References Cited

U.S. PATENT DOCUMENTS 9,595,737 B2    3/2017    Shimamoto et al.
10,050,304 B2    8/2018    Onozuka et al.
(Continued)

FOREIGN PATENT DOCUMENTS

CN    109888386 A    6/2019
CN    109980282 A    7/2019
(Continued)

OTHER PUBLICATIONS

CAS No. 1839621-10-1, Fluorosulfuric acid, 2-methoxy-4-(2-propen-1-yl)phenyl ester (prodcut catalog).
(Continued)

*Primary Examiner* — Stephan J Essex
*Assistant Examiner* — Benjamin T Lustgraaf
(74) *Attorney, Agent, or Firm* — Fox Rothschild LLP

(57) ABSTRACT

Disclosed is an additive for an electrolyte solution to improve the electrochemical properties of a lithium secondary battery.
Especially, an electrolyte solution for a lithium secondary battery include: an electrolyte salt, an organic solvent, and one or more additives comprising a vinylene carbonate (VC) compound having a structure of Formula 1 and 4-allyl-2-methoxyphenyl fluoro sulfate having a structure of Formula 2:

(Continued)

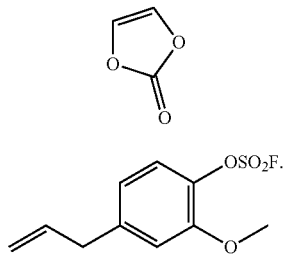

[Formula 1]

[Formula 2]

11 Claims, 4 Drawing Sheets

(51) Int. Cl.
*H01M 4/505* (2010.01)
*H01M 4/525* (2010.01)
*H01M 10/0525* (2010.01)
*H01M 10/0568* (2010.01)
*H01M 10/0569* (2010.01)

(52) U.S. Cl.
CPC ... *H01M 10/0525* (2013.01); *H01M 10/0568* (2013.01); *H01M 10/0569* (2013.01); *H01M 2004/028* (2013.01); *H01M 2220/20* (2013.01); *H01M 2300/0028* (2013.01)

(56) References Cited

U.S. PATENT DOCUMENTS

| | | | | |
|---|---|---|---|---|
| 2016/0013517 A1* | 1/2016 | Nakazawa | ............ | H01M 4/386 |
| | | | | 429/188 |
| 2018/0191027 A1* | 7/2018 | Ohara | ............... | H01M 10/0525 |
| 2022/0231337 A1* | 7/2022 | Takahashi | ......... | H01M 10/0568 |

FOREIGN PATENT DOCUMENTS

| | | |
|---|---|---|
| EP | 3772130 A1 | 2/2021 |
| KR | 10-1264435 B1 | 5/2013 |
| WO | 2017-102557 A1 | 6/2017 |

OTHER PUBLICATIONS

Ninhbo Xu, et al. (2021). Research progress of fluorine-containing electrolyte additives for lithium ion batteries. Journal of Power Sources Advances. 7: 100043.

* cited by examiner

ELECTROLYTE SOLUTION FOR LITHIUM SECONDARY BATTERY AND LITHIUM SECONDARY BATTERY INCLUDING SAME

CROSS REFERENCE TO RELATED APPLICATION

The present application claims priority to Korean Patent Application No. 10-2021-0191207, filed Dec. 29, 2021, the entire contents of which is incorporated herein for all purposes by this reference.

TECHNICAL FIELD

The present invention relates to an electrolyte solution constituting a lithium secondary battery and to a lithium secondary battery including the same. The electrolyte solution may include an additive to improve the electrochemical properties of a lithium secondary battery.

BACKGROUND

Batteries are energy storage sources capable of converting chemical energy into electrical energy or electrical energy into chemical energy. Batteries include non-reusable primary batteries and reusable secondary batteries. Compared to primary batteries which are used once and discarded, secondary batteries are eco-friendly compared because they can be reused.

Recently, as environmental problems have emerged, the demand for hybrid electric vehicle (HEV) and electric vehicle (EV) with little or no air pollution is increasing. In particular, EVs are vehicles in which the internal combustion engine has been completely removed, suggesting the future direction the world should take.

A lithium secondary battery is used as an energy source for EVs. A lithium secondary battery is largely composed of a cathode, an anode, an electrolyte, and a separator. In the cathode and anode, intercalation and deintercalation of lithium ions are repeated to generate energy, an electrolyte becomes a path for lithium ions to move, and in the separator, the cathode and anode meet to prevent a short circuit in a battery.

In particular, the cathode is closely related to the capacity of the battery, and the anode is closely related to the performance of the battery such as high-speed charging and discharging.

The electrolyte typically includes a solvent, an additive, and a lithium salt. The solvent becomes a transport channel that helps lithium ions move back and forth between the cathode and the cathode. In order for a battery to have good performance, lithium ions must be rapidly transferred between the cathode and the anode. Therefore, selecting an optimal electrolyte is very important in order to obtain excellent battery performance.

In particular, a thin film called solid electrolyte interphase (SEI) is formed on the anode in the chemical conversion process performed during the production process of the battery. SEI includes a membrane that can pass lithium ions but not electrons and prevents battery performance from degrading because electrons pass through SEI and induce additional reactions. In addition, the SEI suppresses the direct reaction of the electrolyte and the anode and suppresses the separation of the anode.

The additive of the electrolyte is a substance added in a trace amount of 0.1 to 100% with respect to the weight of the electrolyte. Despite the trace amount added, the performance and stability of the battery are greatly affected by the additives. In particular, the additive induces the formation of SEI on the surface of the anode and plays a role in controlling the thickness of the SEI. In addition, the additive can prevent the battery from being overcharged and can increase the conductivity of lithium ions in the electrolyte.

On the other hand, the energy density of lithium secondary batteries mostly depends on the characteristics of cathode and anode materials, and it is necessary to develop a suitable electrolyte for the developed cathode and anode materials to exhibit excellent electrochemical performance.

Recently, in NCM-based oxide, which is a high-capacity cathode active material, the cathode capacity may have been increased by increasing the Ni content or the high voltage of the charging voltage, but the residual lithium ($Li_2CO_3$ and LiOH) components on the surface of the cathode may accelerate electrolyte decomposition and also increase a degradation rate due to an increase in interface reactivity with the electrolyte, thereby degrading a lithium secondary battery and rapidly degrading electrochemical performance.

Therefore, it is necessary to introduce an additive capable of forming an electrochemically and chemically stable SEI.

The matters described as the background art above are only for improving the understanding of the background of the present invention and should not be accepted as acknowledging that they correspond to the related art already known to those of ordinary skilled in the art.

SUMMARY

In preferred aspects, provided is an additive for an electrolyte solution capable of improving the electrochemical properties of a lithium secondary battery and an electrolyte solution of a lithium secondary battery.

In an aspect, provided is an electrolyte for a lithium secondary battery including an electrolyte salt, an organic solvent, and one or more additives including a vinylene carbonate (VC) compound having a structure of Formula 1 and 4-allyl-2-methoxyphenyl fluoro sulfate having a structure of Formula 2.

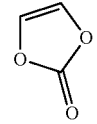

[Formula 1]

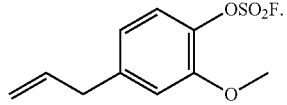

[Formula 2]

The electrolyte may suitably include the 4-allyl-2-methoxyphenyl fluoro sulfate in an amount of about 0.1 to 1.0% by weight with respect to the total weight of the electrolyte.

The electrolyte may suitably include the VC compound in an amount of about 0.1 to 10% by weight with respect to the total weight of the electrolyte.

A ratio of 4-allyl-2-methoxyphenyl fluoro sulfate and VC may be about 1:2 to 1:10.

Electrolyte salts may suitably include one or more compounds selected from the group consisting of $LiPF_6$, $LiBF_4$, $LiClO_4$, LiCl, LiBr, LiI, $LiB_{10}Cl_{10}$, $LiCF_3SO_3$, $LiCF_{3.0}CO_2$, $Li(CF_3SO_2)_{3.0}C$, $LiAsF_6$, $LiSbF_6$, $LiAlCl_4$, $LiCH_3SO_3$, $LiCF_3SO_3$, $LiN(SO_{2.0}C_2F_5)_2$, $Li(CF_3SO_2)_2N$, $LiC_4F_9SO_3$, $LiB(C_6H_5)_4$, and $Li(SO_2F)_2N(LiFSI)$.

A concentration of the electrolyte salt may range from about 0.5 M to about 1.0 M.

The organic solvent may suitably include one or more of solvents selected from the group consisting of a carbonate-based solvent, an ester-based solvent, an ether-based solvent, and a ketone-based solvent.

The term "carbonate-based solvent" as used herein refers to a compound used as solvent, and the compound contains at least carbonate group (e.g., —OC(O)O—). The term "ester-based solvent" as used herein refers to a compound used as solvent, and the compound contains at least ester group (e.g., —C(O)O—). The term "ether-based solvent" as used herein refers to a compound used as solvent, and the compound contains at least ester group (e.g., —O—). The term "ketone-based solvent" as used herein refers to a compound used as solvent, and the compound contains at least ester group (e.g., —C(O)—).

The lithium secondary battery, including the electrolyte solution, includes a cathode, an anode, and a separator interposed between the cathode and the anode, and the cathode of the lithium secondary battery may include a nickel-cobalt-manganese (NCM)-based cathode active material, at this time, nickel, cobalt, and manganese may have a ratio of about 6:2:2 to 8:1:1.

When a lithium secondary battery is manufactured using an electrolyte using the VC compound of Formula 1 and the additive of Formula 2, additive 2 may firmly form CEI and SEI in the cathode and anode, thereby obtaining a lithium secondary battery with increased electrochemical characteristics.

As used herein, the term "solution" unless otherwise indicated includes true solution as well as admixtures (which are typically fluid) which may or may not be true solutions as well as dispersions (which may be fluid).

In additional aspects, a vehicle is provided that comprises a lithium secondary battery as disclosed herein. A vehicle is also provided that comprises an electrolyte solution as disclosed herein.

DETAILED DESCRIPTION

Figure 1:
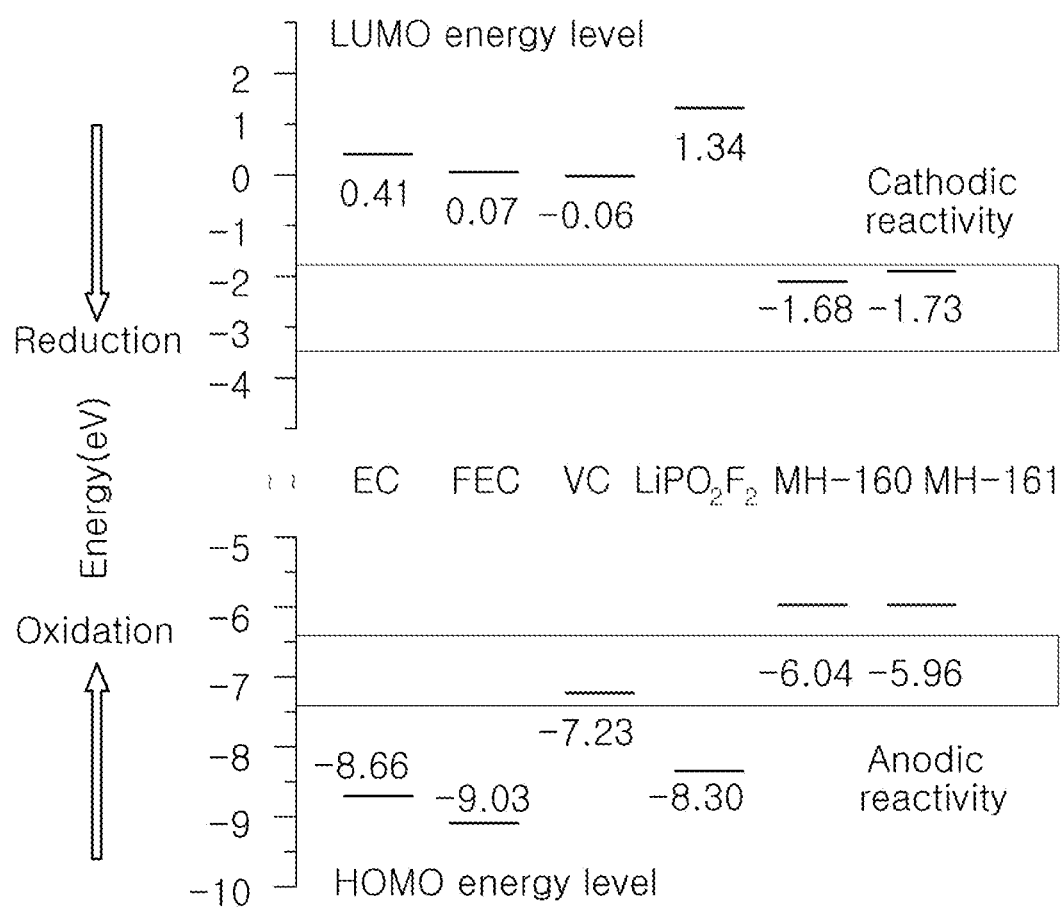
FIG. 1 shows the energy levels of HOMO and LUMO of 4-allyl-2-methoxyphenyl fluoro sulfate.

Hereinafter, specific contents for solving the above-described objective and problems will be described in detail with reference to the accompanying drawings. On the other hand, when the detailed description of a known technology in the same field is not helpful in understanding the core content of the invention in understanding the present invention, the description will be omitted, and the technical spirit of the present invention is not limited thereto and may be variously implemented by being changed by those skilled in the art.

Like reference numbers refer to like elements throughout the description of the figures. In the drawings, the sizes of structures may be exaggerated for clarity. It will be understood that, although the terms "first", "second", etc. may be used herein to describe various elements, these elements should not be construed as being limited by these terms, which are used only to distinguish one element from another. For example, within the scope defined by the present invention, a "first" element may be referred to as a "second" element, and similarly, a "second" element may be referred to as a "first" element. Singular forms are intended to encompass the plural meaning as well, unless the context clearly indicates otherwise.

It will be further understood that terms such as "comprise" or "has", when used in this specification, specify the presence of stated features, integers, steps, operations, elements, components or combinations thereof, but do not preclude the presence or addition of one or more other features, integers, steps, operations, elements, components, or combinations thereof. In addition, it will be understood that, when an element such as a layer, film, region or substrate is referred to as being "on" another element, it can be directly on the other element, or an intervening element may also be present. It will also be understood that when an element such as a layer, film, region or substrate is referred to as being "under" another element, it can be directly under the other element, or an intervening element may also be present.

Unless the context clearly indicates otherwise, all numbers, figures, and/or expressions that represent ingredients, reaction conditions, polymer compositions, and amounts of mixtures used in the specification are approximations that reflect various uncertainties of measurement occurring inherently in obtaining these figures, among other things. For this reason, it should be understood that, in all cases, the term "about" should be understood to modify all such numbers, figures and/or expressions. Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

In addition, when numerical ranges are disclosed in the description, these ranges are continuous, and include all numbers from the minimum to the maximum, including the maximum within each range, unless otherwise defined. Furthermore, when the range refers to an integer, it includes all integers from the minimum to the maximum, including the maximum within the range, unless otherwise defined.

It should be understood that, in the specification, when a range is referred to regarding a parameter, the parameter encompasses all figures including end points disclosed within the range. For example, the range of "5 to 10" includes figures of 5, 6, 7, 8, 9, and 10, as well as arbitrary sub-ranges, such as ranges of 6 to 10, 7 to 10, 6 to 9, and 7 to 9, and any figures, such as 5.5, 6.5, 7.5, 5.5 to 8.5, and 6.5 to 9, between appropriate integers that fall within the range. In addition, for example, the range of "10% to 30%" encompasses all integers that include numbers such as 10%, 11%, 12%, and 13%, as well as 30%, and any sub-ranges, such as 10% to 15%, 12% to 18%, or 20% to 30%, as well as any numbers, such as 10.5%, 15.5%, and 25.5%, between appropriate integers that fall within the range.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Provided herein, inter alia, is an electrolyte solution including one or more additives as well as an electrolyte salt and an organic solvent. As such, the electrochemical properties of a lithium secondary battery may be increased by using a vinylene carbonate (VC) compound having a structure of Formula 1 and 4-allyl-2-methoxyphenyl fluoro sulfate having a structure of Formula 2, separately or simultaneously. Preferably, the VC compound and the 4-allyl-2-methoxyphenyl fluoro sulfate may be used simultaneously in the electrolyte solution.

Formulae 1 and 2 are as follows.

[Formula 1]

[Formula 2]

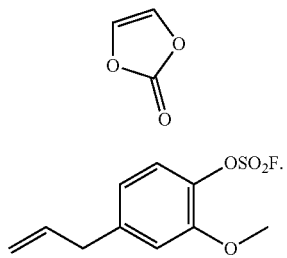

Hereinafter, the VC compound will be denoted as additive 1, and 4-allyl-2-methoxyphenyl fluoro sulfate will be denoted as additive 2.

By using additive 1 and additive 2 simultaneously, cathode electrolyte interphase (CEI) is formed on the cathode, and SEI is formed on the anode, thereby improving the lifespan and output characteristics of the battery.

In particular, since additive 2 has a low LUMO energy level and a high HOMO energy level compared to other materials included in the electrolyte, the additive 2 may react first on the cathode and anode surfaces to form CEI and SEI.

FIG. 1 shows the energy levels corresponding to LUMO and HOMO of additive 2, and MH-160 corresponds to additive 2 of the present invention. As shown in FIG. 1, the HOMO energy level of additive 2 is −6.04 eV, and the energy level of LUMO is −1.68 eV, and it may be expected that the reaction will occur as it is easily decomposed at the cathode and the anode than EC and FEC used as solvents, VC used as additives, and $LiPO_2F_2$.

In particular, the formation of a film can be expected by inducing radical polymerization through the vinyl group at the end of the additive 2. The polymer formed as described above is a polymer component and may have physical flexibility, thereby suppressing breakage of a film structure due to volume expansion and contraction caused by an anode problem, and a phenomenon in which the film is continuously thickened due to breakage of the cathode film structure and the resulting exposure of the cathode active material.

In addition, the molecules are dissociated in the electrolyte to have a sulfonate group ($—OSO^2—$) and are expected to form SEI of $Li_2SO_3$ and $ROSO_2Li$ components. The sulfone-based components such as $Li_2SO_3$ and $ROSO_2Li$ are expected to play a role in improving electrochemical properties by forming a film having low resistance and excellent thermal stability.

In addition, fluorine (F) bonded to the molecular end may form LiF on the surface of the anode, and additive 2 may be more effective in forming LiF because fluorine has a higher deintercalation tendency than other additives, fluoroethylene carbonate (FEC), (The binding energy of the C—F bond inside the FEC is −1.61 eV, and the binding energy of the S—F bond inside the additive 2 is −4.35 eV).

Preferably, additive 2 may be prepared through the following mechanism.

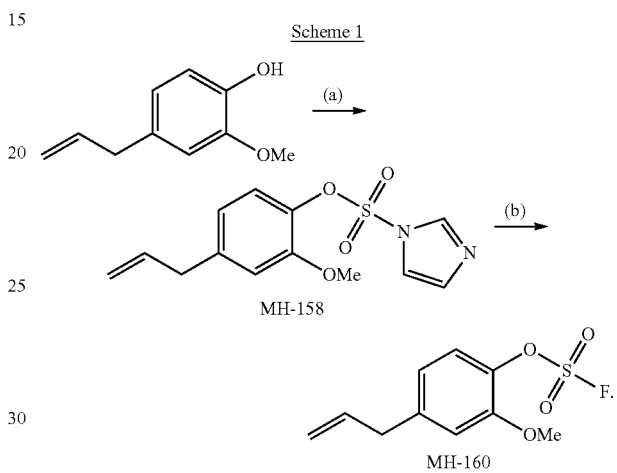

(a) 1,1'-Sulfonylidiimidazole (1.5 equiv), $Cs_2CO_3$ (0.5 equiv), THF, rt, 12 h
(b) AgF (1.8 equiv), MeCN, 80° C., 12 h For example, as shown in the above scheme, 4.00 ml, 25.82 mmol of 4-allyl-2-methoxyphenol and 4.25 g, 13.04 mmol of cesium carbonate are dissolved in 40 ml of tetrahydrofuran, and 7.76 g, 39.15 mmol of 1,1'-sulfonyldiimidazole is added. After the mixture was stirred at room temperature for 12 hours, 4-allyl-2-methoxyphenyl 1H-imidazole-1-sulfonate (MH-158) in the form of a transparent oil was obtained through column chromatography (ethyl acetate/hexanes: 3/7)(98% yield, 7.48 g). As a result of H-NMR, MH-158 could be obtained by obtaining the following result values.

$^1$H NMR (400 MHz, $CDCl_3$) δ 7.77 (s, 1H), 7.24 (t, J=1.5 Hz, 1H), 7.09 (dd, J=1.7, 0.8 Hz, 1H), 6.99 (d, J=8.2 Hz, 1H), 6.74 (dd, J=8.3, 2.0 Hz 1H), 6.69 (d, J=2.0 Hz, 1H), 5.90 (ddt, J=16.9, 10.1, 6.7 Hz, 1H), 5.13-5.05 (m, 2H), 3.59 (s, 3H), 3.35 (d, J=6.7 Hz, 2H). $^{13}C\{^1H\}$ NMR (101 MHz, $CDCl_3$) δ 151.2, 142.1, 137.7, 136.3, 136.1, 130.5, 123.3, 120.9, 119.0, 116.9, 112.9, 55.6, 40.1.

Then, 7.48 g, 25.41 mmol of MH-158 was dissolved in 100 ml of acetonitrile, 5.58 g, 46.35 mmol of silver(I) fluoride was added, and the mixture was stirred at 80° C. for 12 hours, and then 4-allyl-2-methoxyphenyl fluoro sulfate (MH-160) in the form of yellow oil can be obtained through column chromatography (ethyl acetate/hexanes: 3/7) (98% yield, 6.16 g).

As a result of H-NMR, MH-160 could be obtained by obtaining the following result values.

$^1$H NMR (400 MHz, $CDCl_3$) δ 7.34-7.27 (m, 1H), 6.93 (s, 1H) 6.88 (d, J=8.3 Hz, 1H), 6.08-5.95 (m, 1H), 5.24-5.16 (m, 2H), 3.97 (s, 3H), 3.47 (d, J=6.7 Hz, 2H), $^{19}F\{^1H\}$ NMR (377 MHz, $CDCl_3$) δ 39.4.

Hereinafter, the results of experiments on electrochemical properties by manufacturing a lithium secondary battery using the additive will be described.

The cathode may suitably include an NCM-based cathode active material made of Ni, Co, and Mn, and in particular, NCM811 was used in this embodiment. As the cathode active material may be used of $LiCoO_2$, $LiMnO_2$, $LiNiO_2$, $LiN_{1-x}Co_xO_2$, $LiNi_{0.5}Mn_{0.5}O_2$, $LiMn_{2-x}M_xO_4$ (M is Al, Li or a transition metal), $LiFePO$, and the like, and all other cathode active materials that can be used for lithium secondary batteries may be used.

The cathode may further include a conductive material and a binder.

The conductive material may impart conductivity to an electrode. Any electronically conductive material without causing chemical changes in a configured battery can be used as a conductive material. For example, natural graphite, artificial graphite, carbon black, acetylene black, Ketjen black, carbon fiber, metal powder such as copper, nickel, aluminum, silver, metal fiber, and the like may be preferably used as a conductive material, and one or more types of conductive materials including polyphenylene derivatives may be used alone or together (e.g., mixture).

The binder may adhere the particles of the active material well to each other or to the current collector, which is to mechanically stabilize the electrode. The active material may be stably fixed in the process of repeated intercalation and deintercalation of lithium ions to prevent the loosening of the bond between the active material and the conductive material. The binder may include polyvinyl alcohol, carboxymethyl cellulose, hydroxypropyl cellulose, diacetyl cellulose, polyvinyl chloride, carboxylated polyvinyl chloride, polyvinyl fluoride, a polymer including ethylene oxide, polyvinylpyrrolidone, polyurethane, polytetrafluoroethylene, polyvinylidene fluoride, polyethylene, polypropylene, styrene-butadiene rubber, acrylated styrene-butadiene rubber, epoxy resin, nylon, and the like, but is not limited thereto.

The anode may suitably include one or more of carbon (C)-based or silicon (Si)-based anode active material, and the carbon-based anode material may suitably include one or more materials selected from the group consisting of artificial graphite, natural graphite, graphitized carbon fiber, graphitized meso-carbon microbeads, fullerene, and amorphous carbon, and the silicon-based anode active material may include any one of $SiO_x$ and silicon-carbon composite materials. In particular, the active anode material may preferably include a graphite.

Like the cathode, the anode may further include a binder and a conductive material.

The electrolyte solution may suitably include an organic solvent and additives.

The organic solvent may include one or more of solvents selected from the group consisting of a carbonate-based solvent, an ester-based solvent, an ether-based solvent, and a ketone-based solvent.

The carbonate-based solvent may suitably include dimethyl carbonate (DMC), diethyl carbonate (DEC), dipropyl carbonate (DPC), methyl propyl carbonate (MPC), ethyl propyl carbonate (EPC), ethyl methyl carbonate (EMC), ethylene carbonate (EC), propylene carbonate (PC), butylene carbonate (BC), fluoroethylene carbonate (FEC), vinylene carbonate (VC), and the like. In addition, γ-butyrolactone (GBL), n-methyl acetate, n-ethyl acetate, n-propyl acetate, and the like may be used as the ester-based solvent, and dibutyl ether may be used as the ether-based solvent but is not limited thereto.

The solvent may further include an aromatic hydrocarbon-based organic solvent. The aromatic hydrocarbon-based organic solvent may preferably include alone or in combination of benzene, fluorobenzene, bromobenzene, chlorobenzene, cyclohexyl benzene, isopropyl benzene, n-butylbenzene, octyl benzene, toluene, xylene, mesitylene, and the like.

The separator prevents a short circuit between the cathode and anode and provides a passage for lithium ions to move. Such separators may include known materials such as polyolefin-based polymer membranes such as polypropylene, polyethylene, polyethylene/polypropylene, polyethylene/polypropylene/polyethylene, and polypropylene/polyethylene/polypropylene, or multilayers thereof, microporous films, woven fabrics, and non-woven fabrics. In addition, a film coated with a resin having excellent stability on the porous polyolefin film may be used.

EXAMPLE

Preparation and Experiment of Batteries Corresponding to Comparative Examples and Examples <Preparation of Cathode>

For the preparation of the cathode, PVdF was dissolved in NMP to prepare a binder solution.

A slurry was prepared by mixing the cathode active material, and Ketjen Black used as a conductive material in a binder solution. The slurry was coated on both sides of an aluminum foil and dried.

After that, a rolling process and a drying process were performed, and the aluminum electrode was ultrasonically welded to prepare a cathode. In the rolling process, the thickness was adjusted to be 120 μm to 150 μm.

In this case, $Li[Ni_{1-x-y}Co_xMn_y]O_2$ (1−x−y>0.6), a material in which Ni, Co, and Mn were mixed in the ratio of an 8:1:1, was used as the cathode active material.

<Preparation of Anode>

A slurry was prepared by mixing the anode active material, and Ketjen Black used as a conductive material in a binder solution. The slurry was coated on both sides of an aluminum foil and dried.

After that, a rolling process and a drying process were performed, and the aluminum electrode was ultrasonically welded to prepare a cathode. In the rolling process, the thickness was adjusted to be 120 μm to 150 μm.

At this time, graphite was used as the anode active material.

<Preparation of Electrolyte Solution>

A mixture of ethylene carbonate (EC), ethyl methyl carbonate (EMC), and diethyl carbonate (DEC) in a volume ratio of 25:45:30 was used as an organic solvent, and 0.5 M $LiPF_6$ and 0.5 M LiFSI were dissolved in the solvent as lithium salts, and the electrolyte was injected. In addition, according to each Example, different ratios of additive 2 were added to the organic solvent.

<Preparation of Coin Cell>

After interposing a separator between the cathode and the anode, and then wound to prepare a jelly roll. A coin cell was prepared using the prepared jelly roll and electrolyte.

Comparative Example 1

Only additive 1 (1.0% by weight) was used as an additive in the electrolyte to produce a lithium secondary battery that does not include additive 2.

Comparative Example 2

A lithium secondary battery was produced using an electrolyte solution further including additive 1 (1.0% by weight) and LiPO$_2$F$_2$ (0.5% by weight) as an additive.

Example 1

A lithium secondary battery was produced using an electrolyte solution including additive 1 (1.0% by weight) and additive 2 (0.1% by weight).

Example 2

A lithium secondary battery was produced using an electrolyte solution further including additive 1 (1.0% by weight) and additive 2 (0.5% by weight).

Example 3

A lithium secondary battery was produced using an electrolyte solution including additive 1 (1.0% by weight) and additive 2 (0.1% by weight).

For Comparative Examples 1 to 2 and Examples 1 to 3, the results of measuring the cell initial charging and discharging efficiency, the lifespan characteristics after 100 cycles of charging and discharging at a high temperature (45° C.), and the rate-specific characteristics at a high rate (2 C-rate) are shown in Tables 1, 2 and 3.

TABLE 1

| | Additives (% by weight) | | | Cell initial efficiency (%) |
|---|---|---|---|---|
| | Additive 1 | LiPO$_2$F$_2$ | Additive 2 | |
| Comparative Example 1> | 1.0. | — | — | 88.3% |
| Comparative Example 2> | 1.0. | 0.5. | — | 90.3% |
| <Example 1> | 1.0. | — | 0.1. | 90.2% |
| <Example 2> | 1.0. | — | 0.5. | 89.8% |
| <Example 3> | 1.0. | — | 1.0. | 89.5% |

Table 1 shows the initial cell efficiencies for Comparative Examples and Examples, the cell initial efficiency refers to a value obtained by dividing a discharge capacity by a charge capacity after charging once after the manufacturing of a lithium secondary battery is completed, discharging is performed, and then discharging is performed. The cut-off voltage was set to 2.5 V to 4.2 V, and the C-rate was tested at 1C at 45° C.

As a result of the experiment, in the case of Example 2 in which 0.1% by weight of additive 2 was added, it was confirmed that the initial cell efficiency was the best. Examples 1 and 3 showed higher cell initial efficiency than Comparative Example 1, and experimental results were found to be worse than Comparative Example 2.

Figure 2:
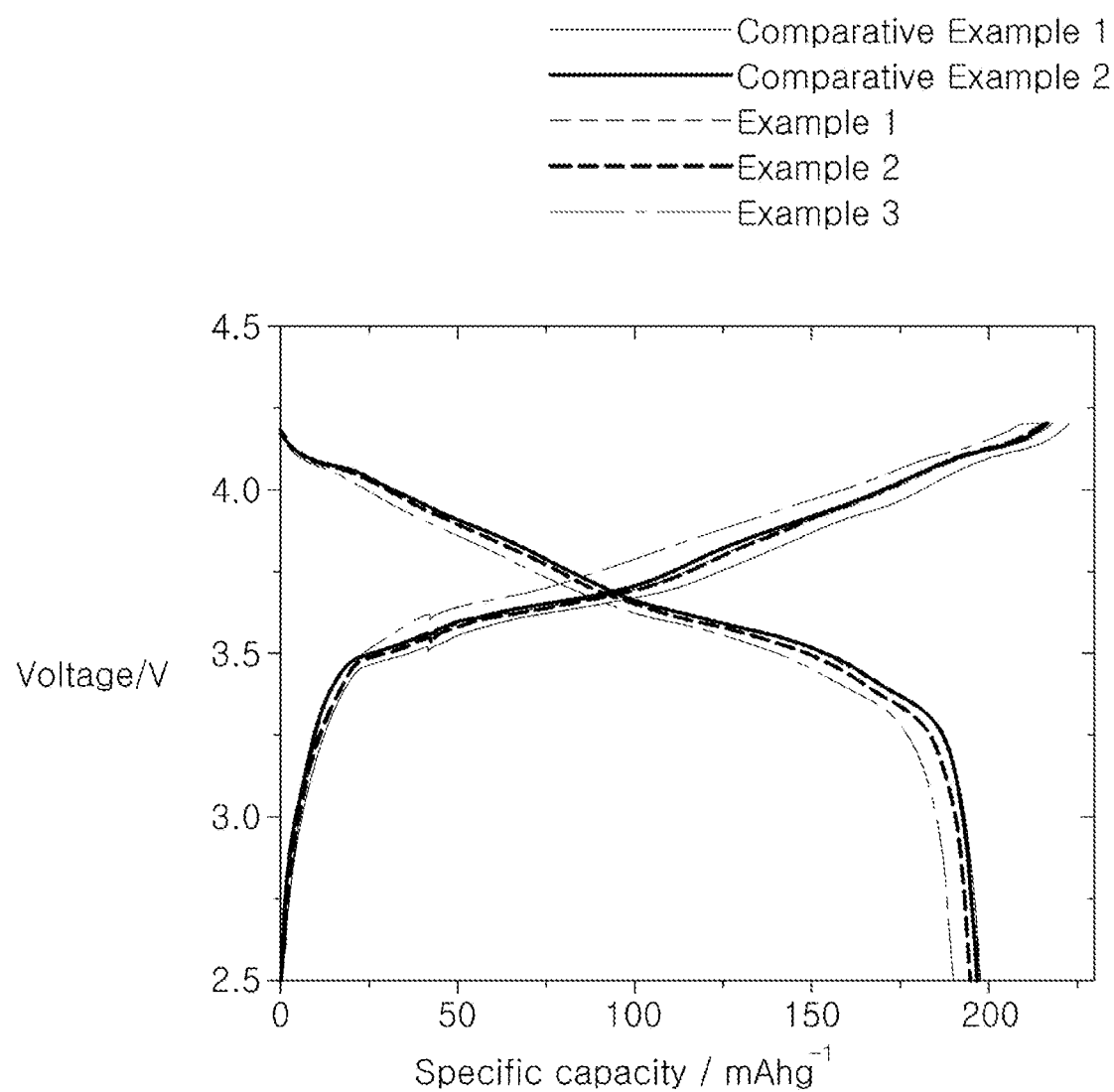
FIG. 2 shows the initial cell efficiency for Comparative Examples and Examples.

A graph for this is shown in FIG. 2.

TABLE 2

| | Additives (% by weight) | | | High-temperature lifespan |
|---|---|---|---|---|
| | Additive 1 | LiPO$_2$F$_2$ | Additive 2 | @100 cycle |
| Comparative Example 1> | 1.0. | — | — | 90.8% |
| Comparative Example 2> | 1.0. | 0.5. | — | 91.0% |
| <Example 1> | 1.0. | — | 0.1. | 91.1% |
| <Example 2> | 1.0. | — | 0.5. | 92.4% |
| <Example 3> | 1.0. | — | 1.0. | 83.2% |

Table 2 shows the high-temperature lifespan for the Comparative Examples and Examples and shows whether the charge/discharge capacity can be maintained to a certain extent compared to the initial charge/discharge capacity after 100 cycles of charging/discharging is repeated. Similarly, the cut-off voltage was set to 2.5 V to 4.2 V, and the C-rate was tested at 1C at a temperature of 45° C. As a result of the experiment, in the case of Example 2 in which 0.5% by weight of the additive 2 was added, the high-temperature life was the best. Example 1 showed a high-temperature lifespan similar to that of Comparative Example 2, and Example 3 showed a high-temperature lifespan lower than that of Comparative Examples.

Figure 3:
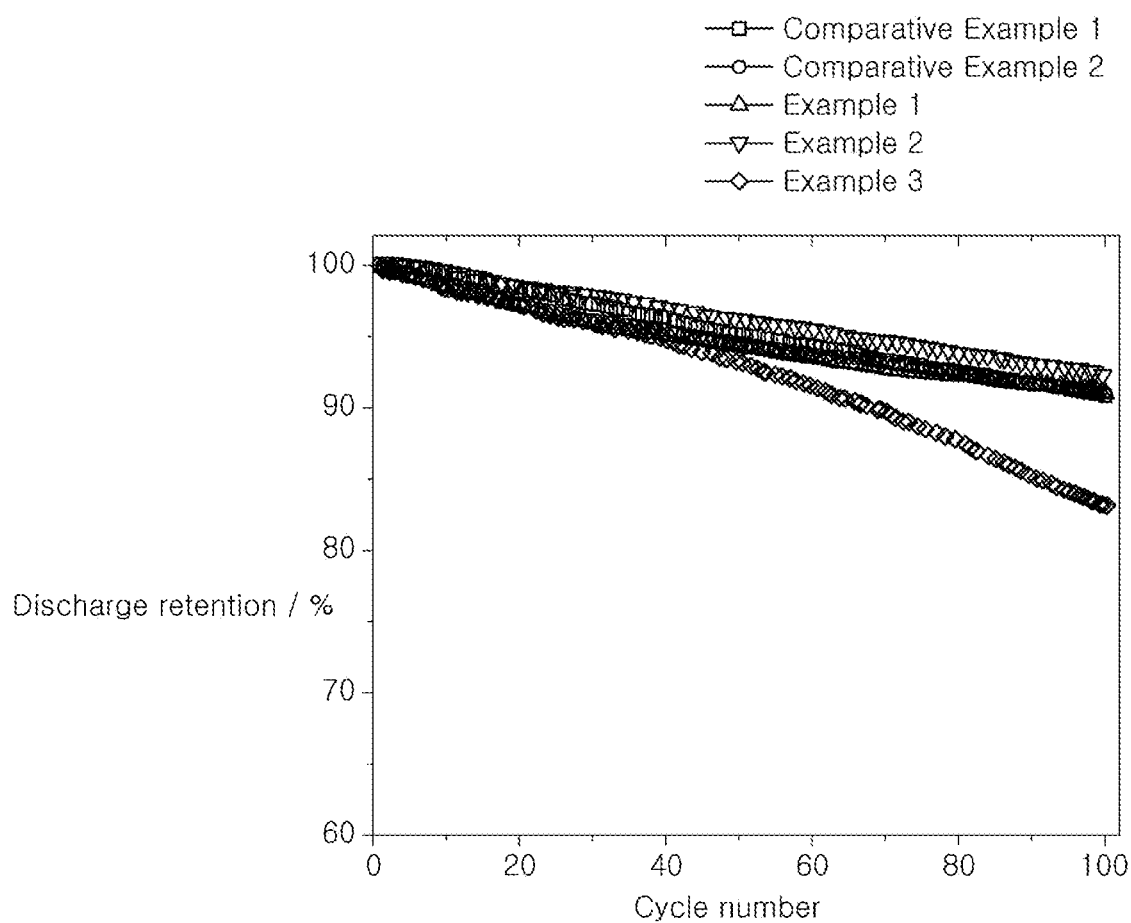
FIG. 3 shows the high-temperature life for Comparative Examples and Examples.

A graph for this is shown in FIG. 3.

TABLE 3

| | Additives (% by weight) | | | Rate-specific characteristics |
|---|---|---|---|---|
| | Additive 1 | LiPO$_2$F$_2$ | Additive 2 | @2C-rate |
| Comparative Example 1> | 1.0. | — | — | 85.7% |
| Comparative Example 2> | 1.0. | 0.5. | — | 85.8% |
| <Example 1> | 1.0. | — | 0.1. | 86.4% |
| <Example 2> | 1.0. | — | 0.5. | 86.8% |
| <Example 3> | 1.0. | — | 1.0. | 86.5% |

Table 3 shows the rate-specific characteristics for Comparative Examples and Examples and shows how much charge/discharge capacity can be maintained compared to the existing 1C-rate by increasing the rate by 2 times compared to other experiments. Similarly, the cut-off voltage was set to 2.5 V to 4.2 V, and the at a temperature of 45° C. As a result of the experiment, in the case of Example 2 in which 0.5% by weight of the additive 2 was added, the rate-specific characteristics were the best.

Figure 4:
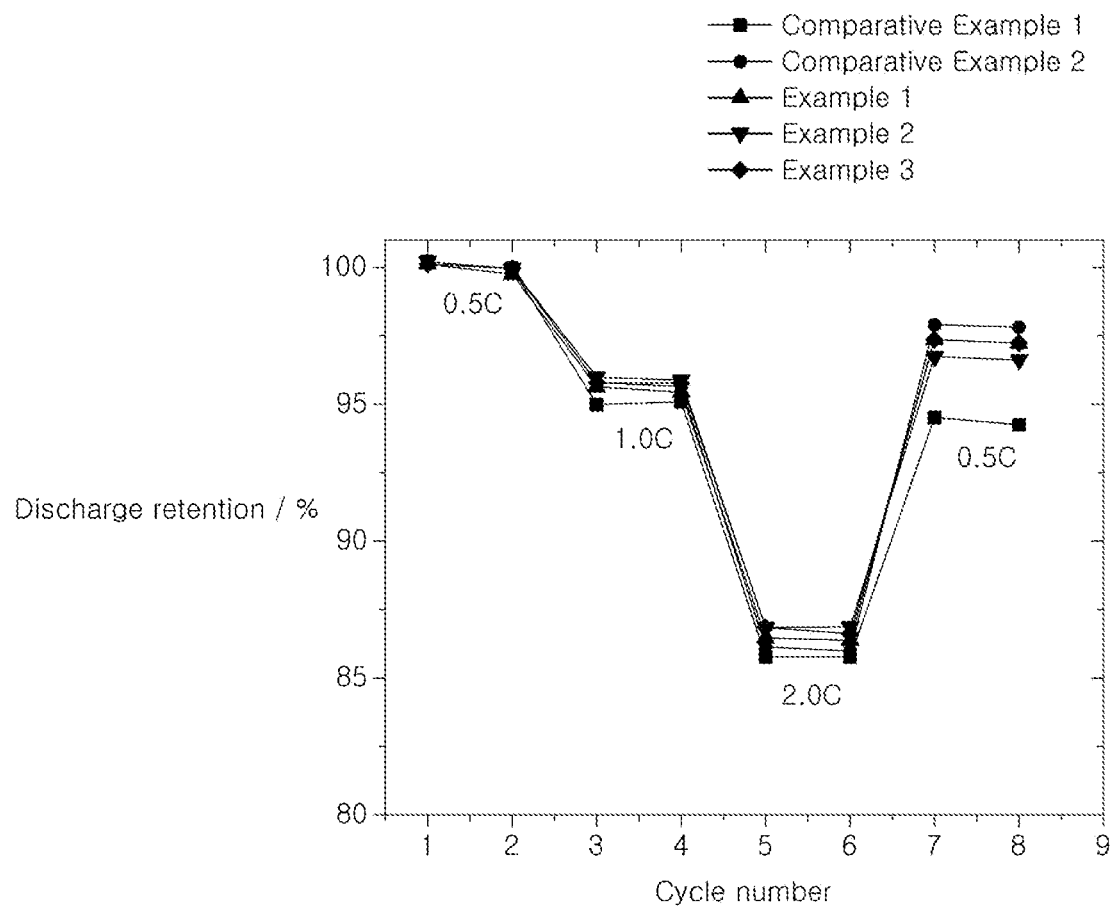
FIG. 4 shows the high rate characteristics for Comparative Examples and Examples.

A graph for this is shown in FIG. 4.

According to exemplary embodiments demonstrated above, when a lithium secondary battery is manufactured using an electrolyte solution using both additive 1 and additive 2, the lithium secondary battery may have improved electrochemical properties, for example, because additive 2 strongly may form CEI and SEI at the cathode and anode.

From the experimental results, additive 1 and additive 2 had the greatest high-temperature lifespan characteristics when added in a ratio of about 2:1 and had the greatest cell initial efficiency when added in a ratio of about 10:1.

Although shown and described with respect to exemplary embodiments of the present invention, it is within the art that the present invention can be variously improved and changed without departing from the spirit of the present invention provided by the following claims. It will be obvious to those of ordinary skilled in the art.

What is claimed is:

1. An electrolyte solution for a lithium secondary battery, the electrolyte solution comprising an electrolyte salt, an organic solvent, and additives comprising both:
a vinylene carbonate (VC) compound having a structure of Formula 1
and 4-allyl-2-methoxyphenyl fluoro sulfate having a structure of Formula 2:

[Formula 1]

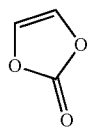

[Formula 2]

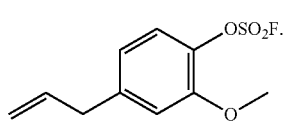

2. The electrolyte solution of claim 1, wherein the electrolyte solution comprises the 4-allyl-2-methoxyphenyl fluoro sulfate in an amount of about 0.1 to 1.0% by weight with respect to the total weight of the electrolyte solution.

3. The electrolyte solution of claim 1, wherein the electrolyte solution comprises the VC compound in an amount of about 0.1 to 10% by weight with respect to the total weight of the electrolyte solution.

4. The electrolyte solution of claim 1, wherein a ratio of the 4-allyl-2-methoxyphenyl fluoro sulfate and the VC in the electrolyte solution is about 1:2 to 1:10.

5. The electrolyte solution of claim 1, wherein the electrolyte salt comprises one or more compounds selected from the group consisting of $LiPF_6$, $LiBF_4$, $LiClO_4$, LiCl, LiBr, LiI, $LiB_{10}Cl_{10}$, $LiCF_3SO_3$, $LiCF_{3.0}CO_2$, $Li(CF_3SO_2)_{3.0}C$, $LiAsF_6$, $LiSbF_6$, $LiAlCl_4$, $LiCH_3SO_3$, $LiCF_3SO_3$, $LiN(SO_{2.0}C_2F_5)_2$, $Li(CF_3SO_2)_2N$, $LiC_4F_9SO_3$, $LiB(C_6H_5)_4$, and $Li(SO_2F)_2N(LiFSI)$.

6. The electrolyte solution of claim 1, wherein a concentration of the electrolyte salt in the electrolyte solution ranges from about 0.5 M to about 1.0 M.

7. The electrolyte solution of claim 1, wherein the organic solvent comprises one or more solvents selected from the group consisting of a carbonate-based solvent, an ester-based solvent, an ether-based solvent, and a ketone-based solvent.

8. A lithium secondary battery comprising a cathode, an anode, a separator interposed between the cathode and the anode, and an electrolyte solution of claim 1.

9. The lithium secondary battery of claim 8, wherein the cathode comprises a nickel-cobalt-manganese-based cathode active material.

10. The lithium secondary battery of claim 9, wherein in the cathode active material, nickel, cobalt, and manganese are present in a ratio of about 6:2:2 to 8:1:1.

11. A vehicle comprising a lithium secondary battery of claim 8.

* * * * *